(12) United States Patent
Jing et al.

(10) Patent No.: US 12,326,383 B2
(45) Date of Patent: Jun. 10, 2025

(54) APPARATUS AND METHOD FOR LEACHING TOXIC SUBSTANCES FROM INORGANIC BINDER-STABILIZED SOLID WASTE MATERIALS

(71) Applicant: Yanshan University, Qinhuangdao (CN)

(72) Inventors: Chao Jing, Qinhuangdao (CN); Mengfan Zhang, Qinhuangdao (CN); Wenhua Shi, Qinhuangdao (CN); Xiaolei Jiao, Qinhuangdao (CN)

(73) Assignee: Yanshan University, Qinhuangdao (CN)

( * ) Notice: Subject to any disclaimer, the term of this patent is extended or adjusted under 35 U.S.C. 154(b) by 0 days.

(21) Appl. No.: 18/885,977

(22) Filed: Sep. 16, 2024

(65) Prior Publication Data
US 2025/0012676 A1    Jan. 9, 2025

Related U.S. Application Data (63) Continuation of application No. PCT/CN2024/076719, filed on Feb. 7, 2024.

(30) Foreign Application Priority Data

Mar. 16, 2023   (CN) .......................... 202310253916.7

(51) Int. Cl.
| | |
|---|---|
| *G01N 1/04* | (2006.01) |
| *B09B 3/25* | (2022.01) |
| *B09B 3/80* | (2022.01) |

(52) U.S. Cl.
CPC ................ *G01N 1/04* (2013.01); *B09B 3/25* (2022.01); *B09B 3/80* (2022.01)

(58) Field of Classification Search
CPC ................ G01N 1/04; B09B 3/80; B09B 3/25
See application file for complete search history.

(56) References Cited

U.S. PATENT DOCUMENTS 11,073,448 B1 *  7/2021  Kelley ................... E21B 10/44

FOREIGN PATENT DOCUMENTS

| CN | 112834416 | * | 5/2021 |
| CN | 112834416 A | | 5/2021 |
| CN | 213749328 U | | 7/2021 |
| CN | 218331153 U | | 1/2023 |

* cited by examiner

*Primary Examiner* — Brian R Gordon
*Assistant Examiner* — Dwan A Gerido
(74) *Attorney, Agent, or Firm* — George D. Morgan (57) ABSTRACT

The present application discloses an apparatus and method for leaching toxic substances from inorganic binder-stabilized solid waste materials. The apparatus includes a specimen placement box, a water supply and drainage system, and an angle adjustment apparatus, wherein a to-be-tested beam type specimen is provided in the specimen placement box; a water inlet joint and a drainage outlet are provided on the specimen placement box; an inlet of the water inlet joint is connected to an outlet of the water supply and drainage system; an outlet of the water inlet joint is positioned above the to-be-tested beam type specimen; the drainage outlet is connected to an inlet of the water supply and drainage system; the angle adjustment apparatus is capable of adjusting inclination of the specimen placement box. The present application further discloses a leaching method based on the apparatus.

5 Claims, 6 Drawing Sheets

APPARATUS AND METHOD FOR LEACHING TOXIC SUBSTANCES FROM INORGANIC BINDER-STABILIZED SOLID WASTE MATERIALS

CROSS-REFERENCE TO RELATED APPLICATIONS

The application claims priority to Chinese patent application No. 2023102539167, filed on Mar. 16, 2023, the entire contents of which are incorporated herein by reference.

TECHNICAL FIELD

The present application relates to a technical field of highway instruments, and in particular, to an apparatus and method for leaching toxic substances from inorganic binder-stabilized solid waste materials.

BACKGROUND

Nowadays, environmental problems have become a focal point of attention across various sectors of society, and China has also issued many norms on environmental governance and the leaching and testing of environmentally toxic substances, such as "HJ 557-2010 Solid Waste-Extraction Procedure for Leaching Toxicity-Horizontal Vibration Method". The norm mentions that a detected substance is to be crushed and passed through a 3 mm sieve, and a certain mass of a sample is weighed and placed in a container, to which distilled water 10 times the mass of the sample is added for sealing. The container is placed on a horizontal oscillator with an amplitude of 4 cm to oscillate for 8 hours and then left to stand for 16 hours. The supernatant is extracted and passed through a 45 µm filter membrane. The identification is carried out according to "GB 5085.3-2007 Identification Standards for Hazardous Waste-Identification for Extraction Toxicity". The principle of the method is to use distilled water as a leaching agent to simulate a process in which solid waste is leached by surface water or underground water in a specific situation, with its harmful components leaching into the environment.

The prior art generally adopts the above method to detect toxic substances in inorganic binder-stabilized solid waste materials. However, the method has the following defects: 1. Inorganic binder-stabilized solid waste materials need to be crushed into fine particles, which is not in line with actual working conditions and greatly reduces the detection effect. 2. A sample is placed on a horizontal oscillator for oscillation, which is not in line with the actual conditions of a road in rainy weather.

SUMMARY

Embodiments of the present application provide an apparatus and method for leaching toxic substances from inorganic binder-stabilized solid waste materials. Toxic substances can be leached from inorganic binder-stabilized solid waste materials in a condition close to actual working conditions, thereby providing more accurate data for harmless utilization of solid waste materials.

To achieve the above objectives, in one aspect, the embodiments of the present application provide an apparatus for leaching toxic substances from inorganic binder-stabilized solid waste materials. The apparatus includes a specimen placement box, a water supply and drainage system, and an angle adjustment apparatus, wherein a to-be-tested beam type specimen is provided in the specimen placement box; a water inlet joint and a drainage outlet are provided on the specimen placement box; an inlet of the water inlet joint is connected to an outlet of the water supply and drainage system; an outlet of the water inlet joint is positioned above the to-be-tested beam type specimen; the drainage outlet is connected to an inlet of the water supply and drainage system; the angle adjustment apparatus is capable of adjusting the inclination of the specimen placement box.

Furthermore, the water supply and drainage system includes a water pipe, as well as a water pump and a water temperature control apparatus sequentially provided on the water pipe, with the water pump being provided near the water inlet joint.

Furthermore, the angle adjustment apparatus includes clamping plates provided on two opposite side walls of the specimen placement box, and a plurality of second clamping grooves evenly distributed in a vertical direction are formed on the clamping plate; a size of the second clamping groove is matched with a size of the water pipe.

Furthermore, the apparatus further includes a control unit; the water pipe is further provided with two electromagnetic regulating valves with flowmeters, one of the electromagnetic regulating valves is provided near the water inlet joint, and the other is provided near the drainage outlet; the control unit is electrically connected to the electromagnetic regulating valves with the flowmeters; the control unit is capable of controlling the electromagnetic regulating valves with the flowmeters to adjust opening degree according to received flow information.

Furthermore, a specimen accommodating shell with an opening facing upward is detachably connected to a bottom surface of the specimen placement box; the to-be-tested beam type specimen is positioned in the specimen accommodating shell.

Furthermore, a water-permeable layer is provided on an upper surface of the to-be-tested beam type specimen; the outlet of the water inlet joint is positioned above the water-permeable layer.

Furthermore, the water inlet joint and the drainage outlet are respectively provided on two opposite side walls in a width direction of the specimen placement box.

Furthermore, a filter screen is provided at the drainage outlet.

In another aspect, the embodiments of the present application further provide a leaching method based on the above apparatus for leaching toxic substances from inorganic binder-stabilized solid waste materials. The method includes the following steps: In step 1, a to-be-tested beam type specimen is placed in a specimen placement box and covered with a water-permeable layer, and then an angle adjustment apparatus is adjusted according to a preset parameter; the preset parameter is an actual highway inclination angle; in step 2, distilled water 10 times the mass of toxic substances is added into a water supply and drainage system; in step 3, the water supply and drainage system is started to enable water flow to submerge the to-be-tested beam type specimen; and in step 4, after the apparatus has been operating for 8 hours, a preset amount of solution is weighed and placed into a container to stand for 16 hours, then the solution is filtered through a 45 µm filter membrane, and a filtrate is sent to a laboratory for testing.

Furthermore, step 2 specifically includes: Distilled water 10 times the mass of toxic substances is added into a water temperature control apparatus, and a preset temperature is set; the preset temperature is an average temperature in a rainy season of an area where the to-be-tested beam type specimen is located.

The present application has the following beneficial effects:
1. In the embodiments of the present application, the apparatus for leaching toxic substances from inorganic binder-stabilized solid waste materials is provided with an angle adjustment apparatus, creating a condition close to the actual condition of rainwater scouring the road, so that the to-be-tested beam type specimen can undergo leaching as a complete structure through water flow scouring without needing to be crushed and then horizontally oscillated. This reduces unreasonable leaching of toxic substances, ensuring that the leaching mode and amount are more in line with engineering practices.
2. In the embodiments of the present application, the apparatus for leaching toxic substances from inorganic binder-stabilized solid waste materials is provided with a water temperature control apparatus, simulating the impact of temperature differences in different areas, so that leaching modes and conditions can be changed according to actual conditions, and thus the test result is more aligned with actual working conditions.

BRIEF DESCRIPTION OF DRAWINGS

To more clearly explain the technical solutions in embodiments of the present application or the prior art, the following will briefly introduce the drawings required for the description of the embodiments or the prior art. It is evident that the drawings described below are merely some embodiments of the present application. For those of ordinary skill in the art, other drawings can be acquired according to these drawings without creative effort.

DETAILED DESCRIPTION OF THE EMBODIMENTS

The technical solutions in embodiments of the present application will be described clearly and completely with reference to the drawings in the embodiments of the present application. It is evident that the described embodiments are merely part of the embodiments of the present application, and not all of the embodiments. All other embodiments acquired by those of ordinary skilled in the art based on the embodiments in the present application without making any creative labor fall within the protection scope of the present application.

In the description of the present application, it should be understood that the orientations or positional relationships indicated by the terms "central", "upper", "lower", "front", "rear", "left", "right", "vertical", "horizontal", "top", "bottom", "inner", "outer", and the like are those shown based on the drawings. These terms are only intended to facilitate the description of the present application and simplify the description rather than indicate or imply that the apparatus or element referred to must have a specific orientation or must be constructed and operated in a specific orientation, and thus, should not to be construed as limiting the present application.

In the description of the present application, it should be noted that, unless otherwise explicitly stated or limited, the terms "installation", "link", and "connection" should be understood in a broad sense. For example, these terms may refer to a fixed connection, a detachable connection, or an integral connection, and the specific meaning of these terms in the present application may be understood according to the specific situation for those of ordinary skill in the art.

The terms "first" and "second" are merely for the purpose of description and are not to be understood as indicating or implying relative importance or implying the number of indicated technical features. Therefore, features defined with "first" or "second" may explicitly or implicitly include one or more of the features. In the description of the present application, the meaning of "a plurality" is two or more unless otherwise specified.

Figure 1:
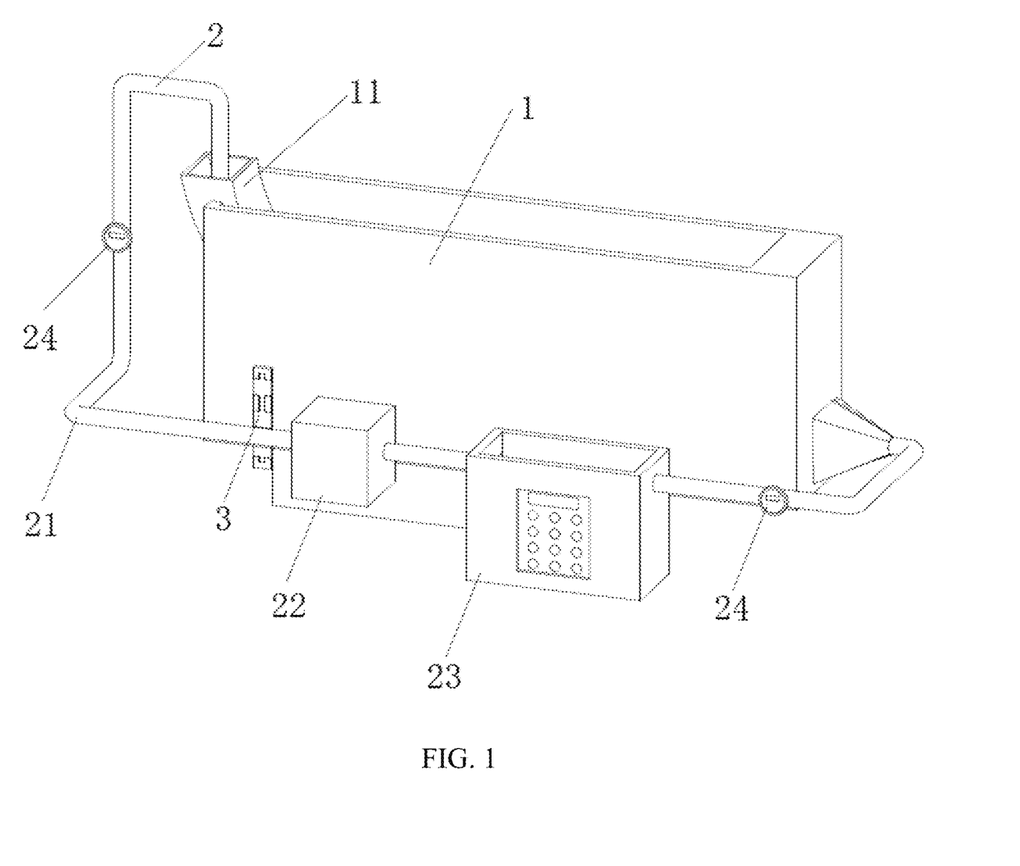
FIG. 1 is a schematic structural diagram of an apparatus for leaching toxic substances from inorganic binder-stabilized solid waste materials from one angle according to the embodiments of the present application.

Referring to FIG. 1, the embodiments of the present application provide an apparatus for leaching toxic substances from inorganic binder-stabilized solid waste materials, which includes a specimen placement box 1, a water supply and drainage system 2, and an angle adjustment apparatus.

Figure 5:
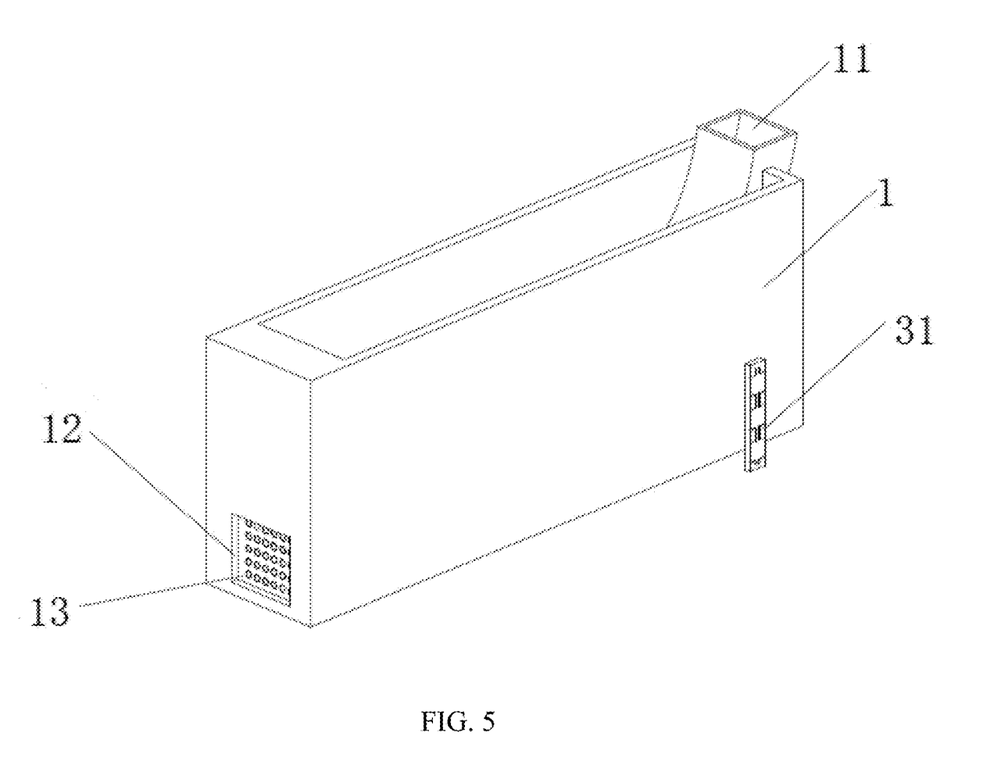
FIG. 5 is a schematic structural diagram of a specimen placement box in the apparatus for leaching toxic substances from inorganic binder-stabilized solid waste materials according to the embodiments of the present application.

Referring to FIGS. 1 and 5, a to-be-tested beam type specimen (not shown in the figure) is provided in the specimen placement box 1. A water inlet joint 11 and a drainage outlet 12 are provided on the specimen placement box 1. The inlet of the water inlet joint 11 is connected to the outlet of the water supply and drainage system 2, the outlet of the water inlet joint 11 is positioned above the to-be-tested beam type specimen, and the drainage outlet 12 is connected to the inlet of the water supply and drainage system 2. The angle adjustment apparatus is capable of adjusting the inclination of the specimen placement box 1.

Before use, the angle adjustment apparatus is adjusted first to enable the inclination angle of the to-be-tested beam type specimen to be equal to the inclination angle of the road surface where the to-be-tested beam type specimen is located, then the water supply and drainage system 2 is started. In this way, the water in the water supply and drainage system 2 can flow to the highest end of the to-be-tested beam type specimen through the outlet of the water inlet joint 11, then flow into the specimen placement box 1 along the upper surface of the to-be-tested beam type specimen, and finally re-enter the water supply and drainage system 2 through the drainage outlet 12. Therefore, the working condition of rainwater scouring the road surface can be simulated, so that the to-be-tested beam type specimen can undergo leaching as a complete structure through water flow scouring without needing to be crushed and then horizontally oscillated. This reduces unreasonable leaching of toxic substances, ensuring that the leaching mode and amount are more in line with engineering practices.

Figure 2:
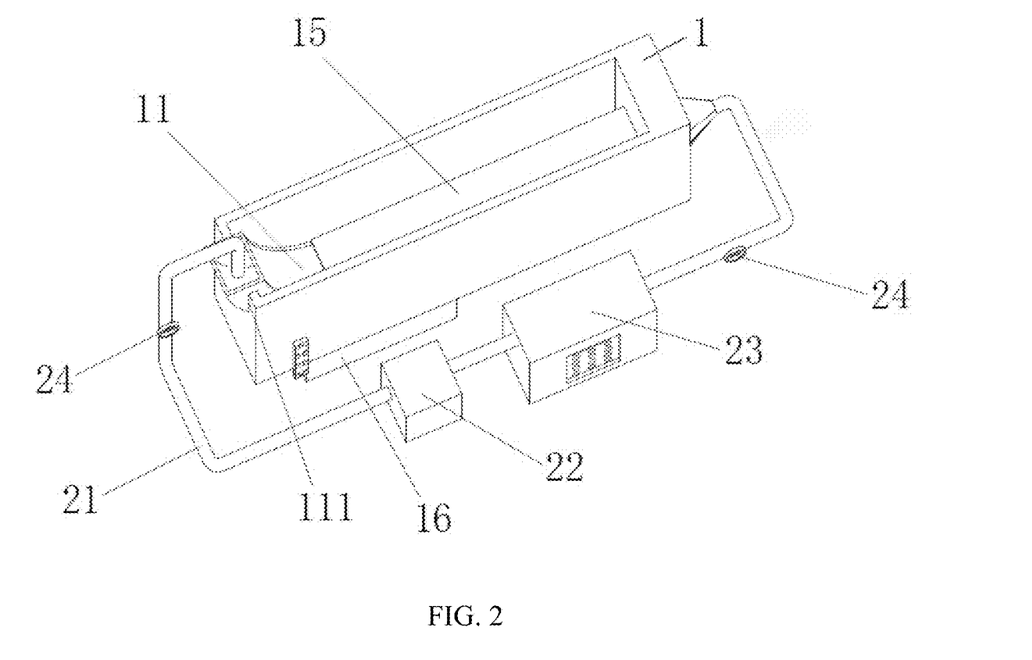
FIG. 2 is a schematic structural diagram of the apparatus for leaching toxic substances from inorganic binder-stabilized solid waste materials from another angle according to the embodiments of the present application.

Referring to FIGS. 2 and 5, in some embodiments, the specimen placement box 1 is a cuboid structure with an opening facing upward. The water inlet joint 11 is provided on the left side wall of the specimen placement box 1. The drainage outlet 12 is provided on the right side wall of the specimen placement box 1 and is provided near the bottom surface. The cross sections of the inlet and the outlet of the water inlet joint 11 are rectangular, with the size of the inlet being larger than that of the outlet. The upper and lower surfaces between the inlet and the outlet of the water inlet joint 11 are both arc surfaces. For convenience of installation, a first clamping groove 111 adapted to the left side wall of the specimen placement box 1 is provided at the bottom of the water inlet joint 11, thereby facilitating the installation and positioning of the water inlet joint 11.

Referring to FIG. 5, in some embodiments, a filter screen 13 is provided at the drainage outlet 12, and the filter screen can prevent larger particles from entering the water supply and drainage system 2, thereby avoiding impacts on working efficiency and test data reliability.

Figure 4:
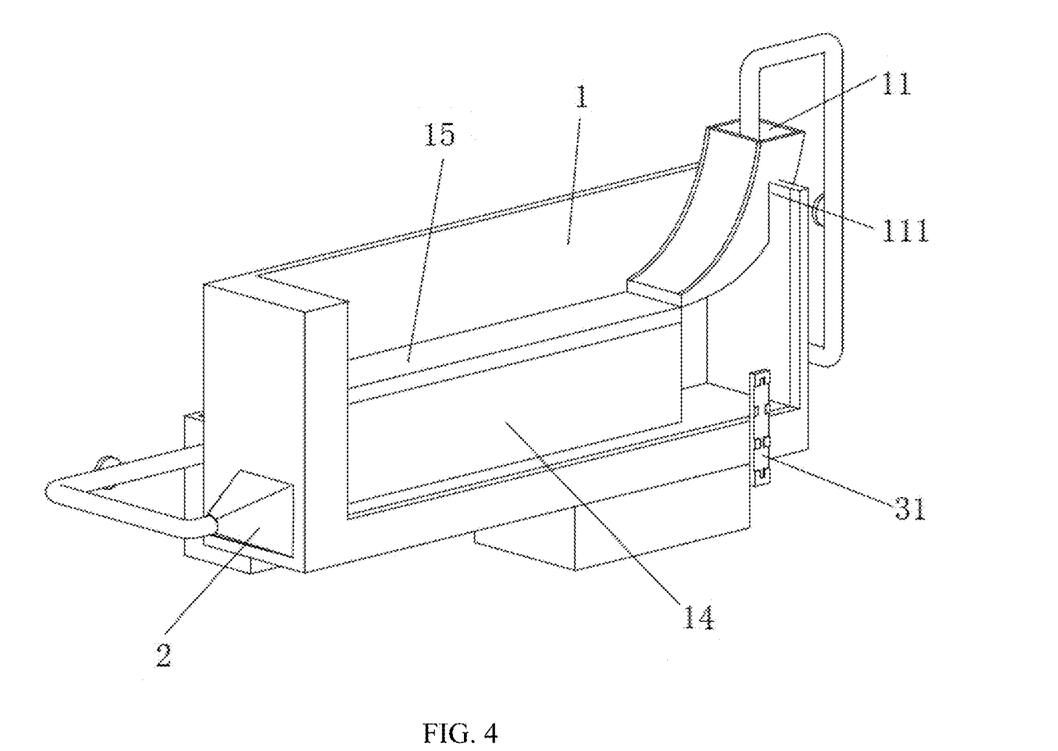
FIG. 4 is a schematic structural diagram of the apparatus for leaching toxic substances from inorganic binder-stabilized solid waste materials from another angle (with the outer side wall removed) according to the embodiments of the present application.

In some embodiments, referring to FIG. 4, a specimen accommodating shell 14 with an opening facing upward is detachably connected to the bottom surface of the specimen placement box 1. The specimen accommodating shell 14 is also a cuboid structure. It should be noted that there may be a plurality of specimen accommodating shells 14 with the same structure but different sizes. The to-be-tested beam type specimen is positioned in the specimen accommodating shell 14. The size of the specimen accommodating shell 14 selected each time may be selected according to the size of the to-be-tested beam type specimen, so as to be applicable to to-be-tested beam type specimens of different sizes.

In some embodiments, a water-permeable layer 15 is provided on the upper surface of the to-be-tested beam type specimen, and the outlet of the water inlet joint 11 is positioned above the water-permeable layer 15. Therefore, the surface layer above the base layer can be simulated, and the leaching result is more accurate.

Figure 6:
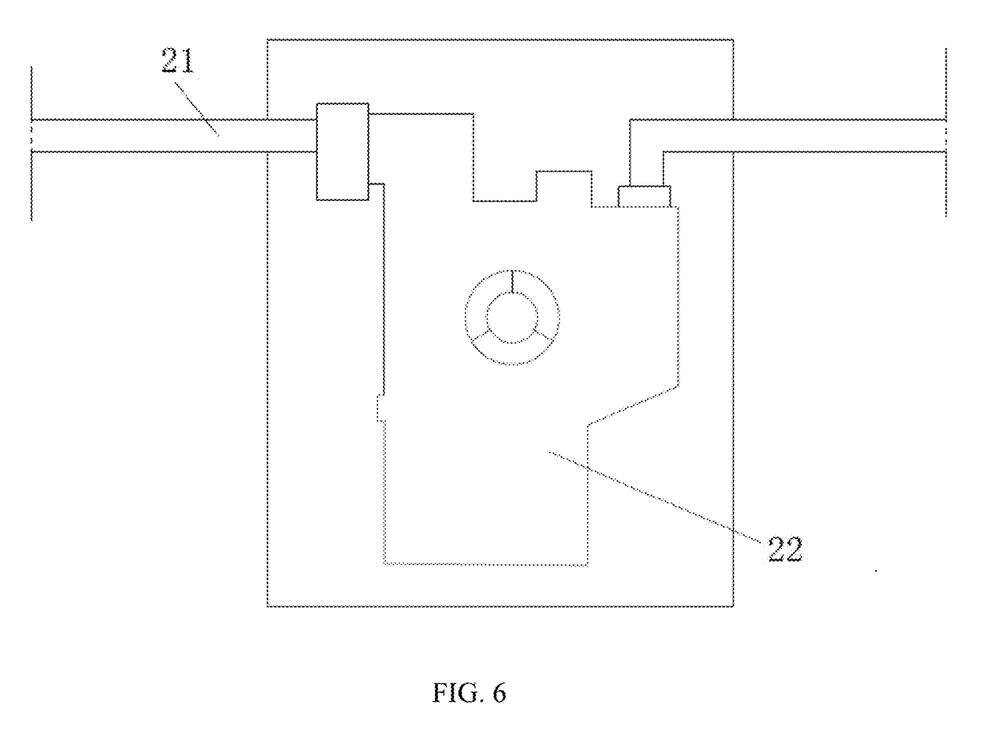
FIG. 6 is a schematic structural diagram of a water pump in the apparatus for leaching toxic substances from inorganic binder-stabilized solid waste materials according to the embodiments of the present application.

Referring to FIGS. 1, 2, and 6, in some embodiments, the water supply and drainage system 2 includes a water pipe 21, as well as a water pump 22 and a water temperature control apparatus 23 sequentially provided on the water pipe 21, with the water pump 22 being provided near the water inlet joint 11. The water temperature control apparatus 23 can adjust the distilled water therein to the average temperature in a rainy season of an area where the to-be-tested specimen is located. The water pump 22 can suck the distilled water in the water temperature control apparatus 23 into the specimen placement box 1, forming a circulation. Both the water pump 22 and the water temperature control apparatus 23 may be placed on the ground or the installation surface. In addition, to keep the balance of the whole apparatus, a supporting block 16 may be further provided at the bottom of the specimen placement box 1.

In some embodiments, the leaching apparatus of the embodiments of the present application further includes a control unit (not shown in the figure). The water pipe 21 is also provided with two electromagnetic regulating valves 24 with flowmeters, one of which is provided near the water inlet joint 11 and the other is provided near the drainage outlet 12. The control unit is electrically connected to both of the electromagnetic regulating valves 24 with flowmeters.

The control unit is capable of controlling the electromagnetic regulating valve 24 with flowmeters to adjust the opening degree according to the received flow information.

Figure 3:
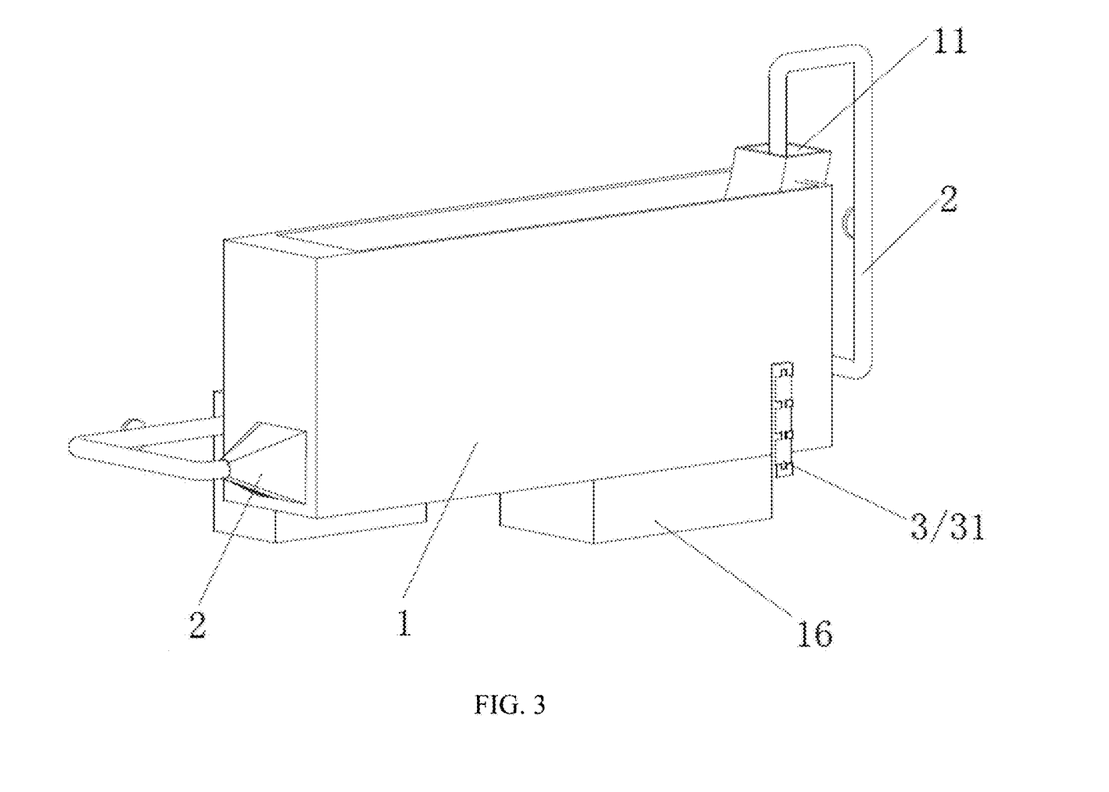
FIG. 3 is a schematic structural diagram of the apparatus for leaching toxic substances from inorganic binder-stabilized solid waste materials from another angle according to the embodiments of the present application.

Referring to FIGS. 1, 3, and 4, in some embodiments, an angle adjustment apparatus includes clamping plates 3 fixedly connected to the front and rear side walls of the specimen placement box 1. The clamping plates 3 are provided near the left side (water inlet joint 11). The clamping plates 3 are rectangular plates extending in a vertical direction. A plurality of second clamping grooves 31 evenly distributed in a vertical direction are formed on the clamping plate 3. The size of the second clamping groove 31 is matched with the size of the water pipe 21. Therefore, the specimen placement box 1 can be tilted both to the right front and to the right rear. It should be noted that the distance between the second clamping grooves 31 is calculated according to a trigonometric function, and each elevation of a second clamping groove 31 represents an increase in angle by a certain degree. Because the whole water pipe 21 is elastic, the whole specimen placement box 1 may slightly swing up and down or back and forth, but the section of the water pipe 21 near the water pump 22 is rigid due to the limitation of the water pump 22 and the water temperature adjustment apparatus. Therefore, when the inclination angle of the to-be-tested beam type specimen needs to be adjusted, it only needs to clamp the water pipe 21 near the water pump 22 into the corresponding second clamping groove 31, making the adjustment very convenient.

The embodiments of the present application further provide a leaching method based on the above apparatus for leaching toxic substances from inorganic binder-stabilized solid waste materials. The method includes the following steps:

In step 1, a to-be-tested beam type specimen is placed in a preset position of a specimen placement box 1 and covered with a water-permeable layer 15, and then the inclination angle of the specimen placement box 1 is set by an angle adjustment apparatus according to the actual highway inclination angle.

In step 2, according to mixing proportion data, distilled water with a mass 10 times that of toxic substances is added into the water temperature control apparatus 23, then the top cover of the water temperature control apparatus 23 is closed, and the water temperature is adjusted to an average temperature in a rainy season of an area where the to-be-tested specimen is located.

In step 3, after the water temperature reaches a calibrated temperature, the water pump 22 is started, and the flow is adjusted through a control unit; a transparent plate (not shown in the figure) is covered on the top of the specimen placement box 1 after the water flow submerges the to-be-tested beam type specimen and the water inflow and outflow are observed to be equivalent, preventing evaporation of water and facilitating observation of the water flow scouring condition.

In step 4, after the apparatus has been operating for 8 hours, a certain amount of solution is weighed and placed into a clean container to stand for 16 hours; the supernatant is filtered through a 45 μm filter membrane referring to the norm "HJ 557-2010 Solid Waste-Extraction Procedure for Leaching Toxicity-Horizontal Vibration Method"; the filtered supernatant is sent to a laboratory as soon as possible for testing referring to toxic substance testing methods related to "GB 5085.3-2007 Standards for Hazardous Waste-Identification for Extraction Toxicity".

The above are merely the specific embodiments of the present application, but the protection scope of the present application is not limited thereto. Any changes or substitutions within the technical scope disclosed in the present application should fall within the protection scope of the present application. Therefore, the protection scope of the present application should be subject to the protection scope of the claims.

What is claimed is:

1. An apparatus for leaching toxic substances from inorganic binder stabilized solid waste materials, comprising: a specimen placement box, comprising a water inlet joint and a drainage outlet, wherein the water inlet joint comprises an inlet and an outlet;
a water supply and drainage system, comprising an inlet and an outlet, wherein the inlet of the water supply and drainage system is connected to the drainage outlet, and the outlet of the water supply and drainage system is connected to the inlet of the water inlet joint; and
an angle adjustment apparatus, arranged on the specimen placement box, wherein the angle adjustment apparatus is capable of adjusting inclination of the specimen placement box;
wherein a beam type specimen is provided in the specimen placement box, and the outlet of the water inlet joint is positioned above the beam type specimen, wherein the water supply and drainage system further comprises a water pipe, a water pump, and a water temperature control apparatus sequentially provided on the water pipe, and wherein a filter screen is provided at the drainage outlet.

2. The apparatus for leaching toxic substances from inorganic binder stabilized solid waste materials according to claim 1, wherein the specimen placement box comprises two side walls arranged opposite each other, the angle adjustment apparatus comprises clamping plates provided on the two opposite side walls of the specimen placement box, and a plurality of water pipe clamping grooves distributed at equal distances in a vertical direction are formed on the clamping plates.

3. The apparatus for leaching toxic substances from inorganic binder stabilized solid waste materials according to claim 1, further comprising a control unit, wherein the water pipe comprises a first side connected to the water inlet joint and a second side connected to the drainage outlet, the water pipe is further provided with two electromagnetic regulating valves with flowmeters, one of the electromagnetic regulating valves is provided at the first side of the water pipe, and the other electromagnetic regulating valve is provided at second side of the water pipe; the control unit is electrically connected to the electromagnetic regulating valves with the flowmeters; the control unit is capable of controlling the electromagnetic regulating valves with the flowmeters to adjust an opening degree of the electromagnetic regulating valves according to flow information received from the control unit.

4. The apparatus for leaching toxic substances from inorganic binder-stabilized solid waste materials according to claim 1, wherein the specimen placement box comprises a bottom surface, and a specimen accommodating shell with an opening facing upward is detachably connected to the bottom surface of the specimen placement box; the to-be-tested beam type specimen is positioned in the specimen accommodating shell.

5. The apparatus for leaching toxic substances from inorganic binder-stabilized solid waste materials according to claim 1, wherein the water inlet joint and the drainage outlet are respectively provided on the two side walls of the specimen placement box.

* * * * *